(12) United States Patent
Riley (10) Patent No.: US 11,810,447 B1
(45) Date of Patent: Nov. 7, 2023

(54) PERSONAL ALARM DEVICE

(71) Applicant: Madison Michelle Riley, Germantown, TN (US)

(72) Inventor: Madison Michelle Riley, Germantown, TN (US)

(*) Notice: Subject to any disclaimer, the term of this patent is extended or adjusted under 35 U.S.C. 154(b) by 208 days.

(21) Appl. No.: 17/239,551

(22) Filed: Apr. 24, 2021

Related U.S. Application Data (60) Provisional application No. 63/015,090, filed on Apr. 24, 2020.

(51) Int. Cl.
| | |
|---|---|
| *G06F 1/16* | (2006.01) |
| *G08B 25/01* | (2006.01) |
| *G08B 25/12* | (2006.01) |
| *H04M 1/72424* | (2021.01) |
| *H04M 1/72412* | (2021.01) |
| *H04W 4/90* | (2018.01) |
| *H04W 4/021* | (2018.01) |

(52) U.S. Cl.
CPC .......... *G08B 25/016* (2013.01); *G06F 1/163* (2013.01); *G08B 25/12* (2013.01); *H04M 1/72412* (2021.01); *H04M 1/72424* (2021.01); *H04W 4/021* (2013.01); *H04W 4/90* (2018.02); *H04M 2242/04* (2013.01); *H04M 2242/30* (2013.01)

(58) Field of Classification Search
CPC ....... G08B 25/016; G08B 25/12; G06F 1/163; H04M 1/72412; H04M 1/72424; H04M 2242/04; H04M 2242/30; H04W 4/021; H04W 4/90
USPC ...................................... 455/404.2
See application file for complete search history.

(56) References Cited

U.S. PATENT DOCUMENTS

| | | | |
|---|---|---|---|
| 8,249,547 B1* | 8/2012 | Fellner ................. | G08B 25/016 455/556.1 |
| 2013/0331058 A1* | 12/2013 | Harvey ................... | H04W 4/90 455/404.2 |

* cited by examiner

*Primary Examiner* — Huy C Ho
(74) *Attorney, Agent, or Firm* — Schrantz Law Firm, PLLC; Stephen D. Schrantz (57) ABSTRACT

The personal alarm device communicates with emergency personnel, such as an emergency dispatcher at 911, and emergency contacts. The user depresses an emergency button that initiates communication with the emergency personnel and the emergency contacts. A covering, such as an outer rim or bezel, covers the emergency button, to limit access to the emergency button. The user rotates the covering to align an opening in the covering with the emergency button. Pressing the emergency button transmits communications to emergency personnel and the emergency contacts. These communications include a phone call, a recorded message, a text message, or other message. The alarm device also provides a light and speaker to assist the user. The speaker plays the audio of the phone call and plays an alarm to alert others in the vicinity of the user.

20 Claims, 4 Drawing Sheets

PERSONAL ALARM DEVICE

CROSS-REFERENCE TO RELATED APPLICATIONS

This application is a continuation in part of U.S. patent application Ser. No. 63/015,090 filed on Apr. 24, 2020 entitled PERSONAL ALARM DEVICE.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to a personal alarm device. The personal alarm device provides a hidden emergency button that allows the user to alert necessary parties in the event of an emergency. The personal alarm device is designed to be worn as a wearable article, such as a watch or wristwatch. The personal alarm device provides many functions to assist the user during an emergency. When the user detects an emergency, the user simply rotates the outer rim of the personal alarm device to access a hidden emergency button. The user then presses the emergency button.

Pressing the emergency button alerts an emergency number, such as 911 or other emergency dispatcher, and any predetermined emergency contacts that the user is experiencing an emergency. The user defines these emergency contacts with contact information in an application or on a web site that is compatible with the personal alarm device. These contacts can include 911 or emergency authorities in the local area, as determined by GPS. In one embodiment, the user sets the emergency contacts via a cellular phone application. The user may also identify the emergency contacts via the personal alarm device. The user adds, removes, edits, or otherwise modifies the emergency contacts and contact information via the application, a website, and/or the device. User preferences and general software updates may also be made using an application, a compatible website, or the personal alarm device.

The user presses the emergency button to contact 911 and the emergency contacts via the device. The device may also contact first responders and emergency personnel near the location of the user determined by the GPS location of the device. The personal alarm device automatically calls 911 upon pressing the emergency button. The device connects the user to 911, not a third party dispatcher. Upon pressing the emergency button, the device also contacts the emergency contacts. In one embodiment, the device calls 911 and sends a text to the emergency contacts.

The personal alarm device provides a microphone and speaker for communicating with the emergency number, such as 911, and the emergency contacts and recording messages if necessary. Another embodiment provides a microphone for recording the user for the transmitted message and a speaker for playing an audible alarm, such as a siren.

In one embodiment, the alarm played through the speaker alerts people nearby to the user's emergency. In one embodiment, the device delays a period of time, such as one second, before activating the alarm to allow the user to deactivate the alarm. The user of one embodiment deactivates the alarm by pressing the emergency button a second time.

The alarm may continue for a predetermined amount of time set by the user. The user may also manually turn the alarm off. In one embodiment, the alarm plays for a default period of seven seconds.

Upon pressing the emergency button, the system transmits a prerecorded audio message and/or automated text message to the emergency contacts according to the settings. The user may define the message via the device, the application, and/or the web. All these capabilities can be controlled on the personal alarm device or using a compatible web enabled device.

The personal alarm device also provides a system for relaying real time location coordinates. In one embodiment, the personal alarm device also provides health tracking functionality such as distance walked, heart rate, steps, sleep patterns, and other parameters.

In another embodiment, the personal alarm device also provides a flashlight. The user may activate the flashlight by pressing the appropriate button on the personal alarm device, or through the compatible application.

The personal alarm device of the present invention overcomes many disadvantages of the known art. The personal alarm device provides beneficial features not found in currently available devices. In view of the foregoing, the personal alarm device of the present invention is well suited for increasing security, safety, and providing the most helpful information to emergency responders and emergency contacts in the event of an emergency. Therefore, the present invention is needed to provide a more effective personal alarm device for personal safety.

II. Description of the Known Art

Patents and patent applications disclosing relevant information are disclosed below. These patents and patent applications are hereby expressly incorporated by reference in their entirety.

U.S. Patent Publication No. 2011/0319048 issued to Matlock on Dec. 29, 2011 ("the '048 publication") teaches an emergency alert device with tactile features to allow a user to discretely report an emergency without the need to look at the device. The '048 publication teaches an emergency button located under a lid-type cover to prevent the device from transmitting accidental emergency alerts. The device taught by the '048 publication contains a processor, antenna, and battery that may be located within the body of the device. The '048 publication teaches that, in some embodiments, the antenna may be a mobile telephone antenna or a GPS antenna. The user may program the numbers associated with the button taught by the '048 publication. These numbers may include emergency services such as paramedics or police, or the numbers may be the user's emergency contact person.

U.S. Patent Publication No. 2013/0331058 issued to Harvey on Dec. 12, 2013 ("the '058 publication") teaches an emergency alert system that is adapted to be worn by a user and to automatically make a cellular phone call to an emergency services center upon activation by a user. The device taught by the '058 publication automatically transmits its current location—derived from GPS, cellular telephone triangulation, or otherwise. The '058 publication teaches that the device sends a text message to the emergency services center if the center is equipped to receive text messages. Alternatively, if the emergency services center is not equipped to receive text messages, the '058 publication teaches that the device will instead deliver a synthesized voice message to the emergency services center.

The device taught by the '058 publication does not require the user to dial any phone numbers to activate the call. The '058 publication teaches that the device may be attached to, or incorporated into a wrist watch. The device taught by the '058 publication also automatically sends a text message to a recipient who is pre-designated by the user. The '058 publication teaches that these text message includes the user's current location. Repeated text messages are sent by the device taught in the '058 publication if the user's position changes by more than a threshold.

SUMMARY OF THE INVENTION

The personal alarm device of the present invention enables a user to activate an alarm system in the event of an emergency. The personal alarm device provides a hidden emergency button that allows the user to alert necessary parties in the event of an emergency. The emergency button of the personal alarm device is covered by the top of the personal alarm device to prevent the user from accidentally pressing the emergency button. Covering the emergency button also disguises the fact that the personal alarm device provides safety features.

To access the emergency button, the user rotates the covering, such as the outer rim or bezel of the personal alarm device. The covering provides an opening. The user aligns the opening with the emergency button to access the emergency button.

The personal alarm device provides a wireless communication system capable of transmitting emergency messages. The communication system enables wireless phone calls and wireless messaging. The communication system of one embodiment provides a processor and antennae for wireless communication.

A power source, such as a battery, powers the personal alarm device. In one embodiment, the user recharges the battery while the battery is within a housing of the personal alarm device. In one embodiment, the charger magnetically connects to the device to charge the device. In such an embodiment, the device may be sealed for water resistance.

The communication system transmits emergency messages and/or phone calls to pre-programmed contacts in the event of an emergency. When the user presses the emergency button, an emergency message and/or phone call is sent to an emergency number, such as 911 or other emergency dispatcher, and any emergency contacts defined by the user. In one embodiment, the communication system calls 911 or a local emergency service as identified by GPS.

The personal alarm device automatically contacts the emergency number, such as 911 or other emergency authorities, upon the user pressing the emergency button. The device contacts the emergency number and any emergency contact specified by the user, not a third party dispatcher. The device transmits a voice communication, written communication, text message, and/or voice message to the emergency number and any emergency contacts.

The personal alarm device provides its own communication system. The device of one embodiment operates without requiring a separate cell phone or smart device that transmits the emergency messages. The personal alarm device contacts the emergency number and emergency contacts even if the user's phone is disabled, not charged, or not within a certain range of the personal alarm device. The user can customize the settings and add, edit, or otherwise modify the emergency contacts via a cell phone application, computer, or the device. The cell phone or other computing device is not required for communication with emergency contacts or 911 as the communication system of the device transmits and receives such communication. In one embodiment, the communication system provides an antenna to allow cellular service to allow communication with a server and the emergency contacts. Another embodiment connects to a networked device, such as a cellular device, a cellular phone, WIFI, router, hot sport, or other network that allows communication with the server.

The personal alarm device also operates in conjunction with an application or website accessed on a cell phone, tablet, mobile device, or other mobile computing device. The application and website enable the user to identify and customize certain settings and features of the personal alarm device, including emergency contact information and face display settings. Settings can also be altered using the personal alarm device itself.

When a user logs in to the application or web site, the user is prompted to enter a code associated with the personal alarm device. In one embodiment, this code is enclosed within the packaging, secured to the device, and/or displayed on a screen of the device. In one embodiment, the user enters the code to modify the settings of the device and to enter the emergency contacts. The user may also enter the user's medical information.

The user enters emergency medical information such as allergies, diabetic status, blood type, or other relevant medical information into the compatible application or website. The medical information is stored locally in the device or on a server. The medical information may be transmitted to first responders or the emergency contacts upon the user activating the alert. When the personal alarm device contacts emergency contacts such as 911 or predetermined emergency contacts stored within the app, the personal alarm device transmits this emergency medical information to the predetermined emergency contacts. The user may identify the information that each emergency contact receives.

The user accesses the settings of the device via the device, an application, or a website. The user controls Bluetooth settings to connect the personal alarm device, update software and settings on the personal alarm device, and customize the displays on the personal alarm device.

The user communicates with emergency personnel via a microphone and speaker of the personal alarm device. The device provides for one way communication and/or two-way communication. One way communication allows only the user to communicate with the emergency contact. Two-way communication allows the user and the emergency contact to communicate with each other.

In one embodiment providing one way communication, the device transmits audio captured by the microphone to the emergency contact. The user cannot hear any audio from the emergency contact. Playing the audio may alert the assailant or other person thus placing the user in danger.

In one embodiment providing two-way communication, the device transmits audio captured by the microphone to the emergency. The device outputs the audio received from the emergency personnel through a speaker of the device. Such two-way communication allows the user and emergency personnel to communicate with each other.

The system also provides an alarm, such as an audible siren, sound, noise, or other alert. The speaker plays the alarm. Such a speaker may be limited to playing the alarm without audio from the emergency personnel if one way communication is enabled. In another embodiment, the speaker may play the alarm and the audio from the emergency contact.

The microphone also permits audio recording. In one embodiment, the personal alarm device begins recording once the emergency button is pressed. In this embodiment, the recording lasts for a set recording time, such as 15 seconds to one minute. The recording is then sent to 911 and/or other emergency contacts after the emergency personnel answers the phone or the recording time expires. After the recording is sent to the specified contacts, the recording may be deleted or stored. The user may then press the button again to begin another recording and transmit another recorded message to emergency personnel and emergency contacts.

A tracking system such as a GPS system tracks the user's location. The communication system transmits the user's real time location to the user's predetermined emergency contacts and 911. The device provides location-based services such as local emergency contact information and weather information based upon the location of the device. The personal alarm device also transmits the user's location via the automated messages, such as voice or text. The personal alarm device transmits the user's current location to the emergency number, such as 911, and any emergency contacts upon pressing of the emergency button. In another embodiment, the personal alarm device automatically sends the current location of the user to both the emergency numbers, such as 911, and any emergency contacts upon pushing of the emergency button.

First responders, users, and emergency contacts locate the personal alarm device from a cell phone, laptop, or other web enabled device. Such tracking enables the system to track the device. Such tracking also enables the user to find a misplaced, stolen, or otherwise lost device.

The user customizes automated alerts sent by the device. The user specifies the recipients of the automated alerts. The user customizes the automated alerts via the application or compatible website. The personal alarm device sends the user's name, emergency medical information, current location, a recording from the personal alarm device, as well as a pre-made message. The automated alert informs the recipient, such as an emergency contact, that the user has encountered an emergency. In one embodiment, when the button is pressed, the automated alert is sent to a 911 service. This alert includes the user's name, emergency medical information, current location, pre-made message, and any timed recording. In another embodiment, the alert is sent to the user's predetermined emergency contacts when the emergency button is pressed. This message includes the user's name, current location, the pre-made message, and any timed recording.

The face of the personal alarm device provides a display that shows different information. In one embodiment of the present invention, the display is a touch screen display. The user can make a swiping motion on the display to cause the screen to display different information. The display shows information such as the time, temperature, weather data, health information such as number of steps and heart rate, and cell phone notifications such as calls and messages. The user customizes the display of the personal alarm device by accessing the compatible app or the website associated with the personal alarm device.

In one embodiment, the personal alarm device also provides features such as a flashlight and alarm that may be operated from the personal alarm device or remotely from the app. The personal alarm device is also water resistant to allow the user to wear the personal alarm device in a multitude of situations without risk of damaging the personal alarm device. In one embodiment, the personal alarm device is also waterproof.

In another embodiment, the personal alarm device provides sensors to detect the user's heart rate, the number of steps taken by the user, the distance walked by the user, and/or the user's sleep patterns. This information may then be displayed on the face of the personal alarm device or in the application.

It is an object of the present invention to provide a discrete personal alarm device.

It is also an object of the present invention to allow users in emergency situations to notify persons of the emergency.

It is also an object of the present invention to provide an alarm to deter a person who may harm the user.

It is also an object of the present invention to allow emergency responders to locate a user.

It is also an object of the present invention to provide a durable, multifunctional safety device.

These and other objects and advantages of the present invention, along with features of novelty appurtenant thereto, will appear or become apparent in the course of the following descriptive sections and the attached drawings.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

The present invention relates generally to a personal alarm device 100. The personal alarm device 100 enables communication between a user and a third party, such as an emergency dispatcher contacted at an emergency number, such as 911, and any emergency contacts. The user may identify the emergency contacts to be contacted by the personal alarm device 100. The emergency contacts may include first responders, 911, family members, friends, police, and other contacts.

The personal alarm device 100 may be constructed from plastic, metal, silicone, rubber, a rigid or semi-rigid material, or other material. The personal alarm device 100 is a wearable article, such as an article worn on the user's wrist or around the neck. In one embodiment, the wearable article secures to a user's wrist, such as a watch, fitness tracker, bracelet, or other wearable article secured to the wrist or arm. Personal alarm device 100 is water resistant to allow the user to utilize personal alarm device 100 in a multitude of environments. Band 110, such as a watch band, secures the personal alarm device 100 to the user's wrist by watch band 110.

Figure 1:
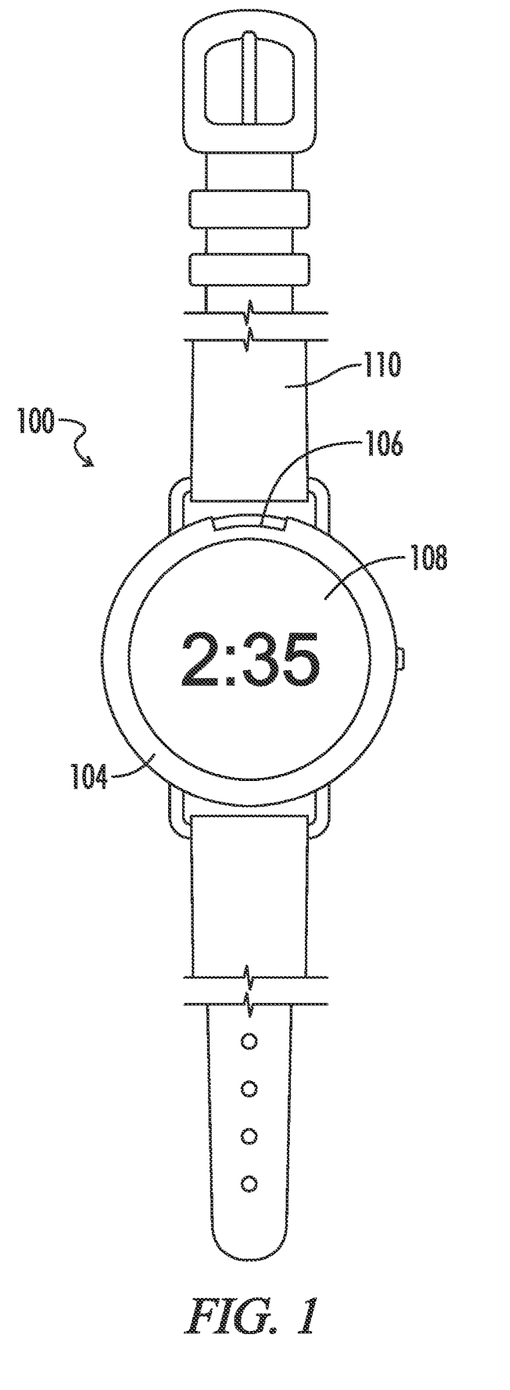
FIG. 1 is a front view showing one embodiment of the present invention.
Figure 2:
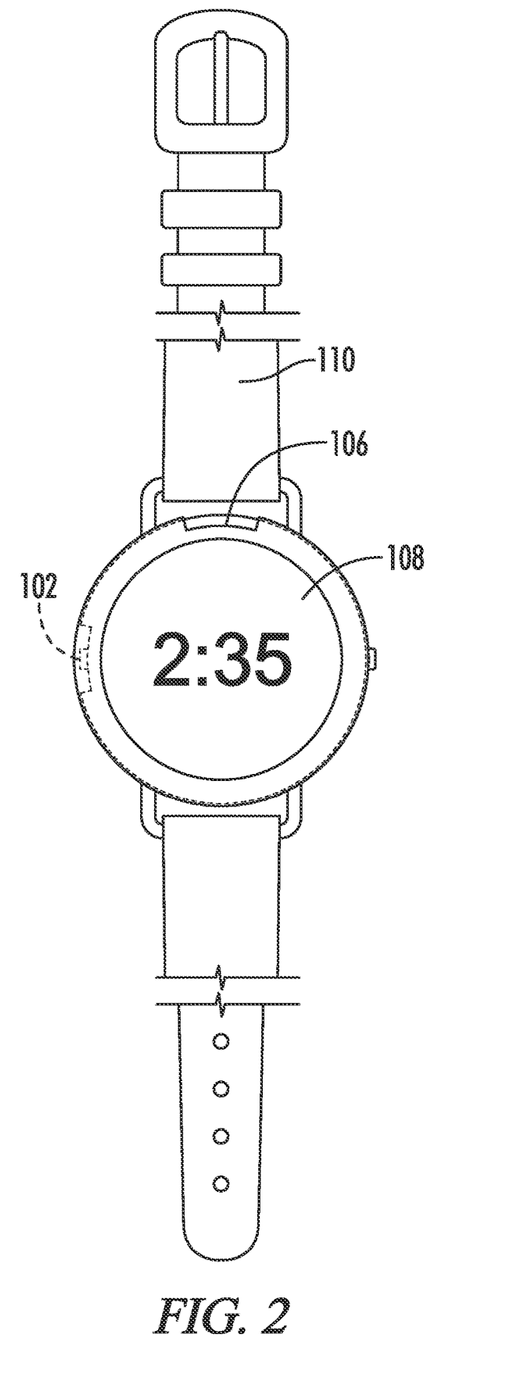
FIG. 2 is a front sectional view thereof.
Figure 3:
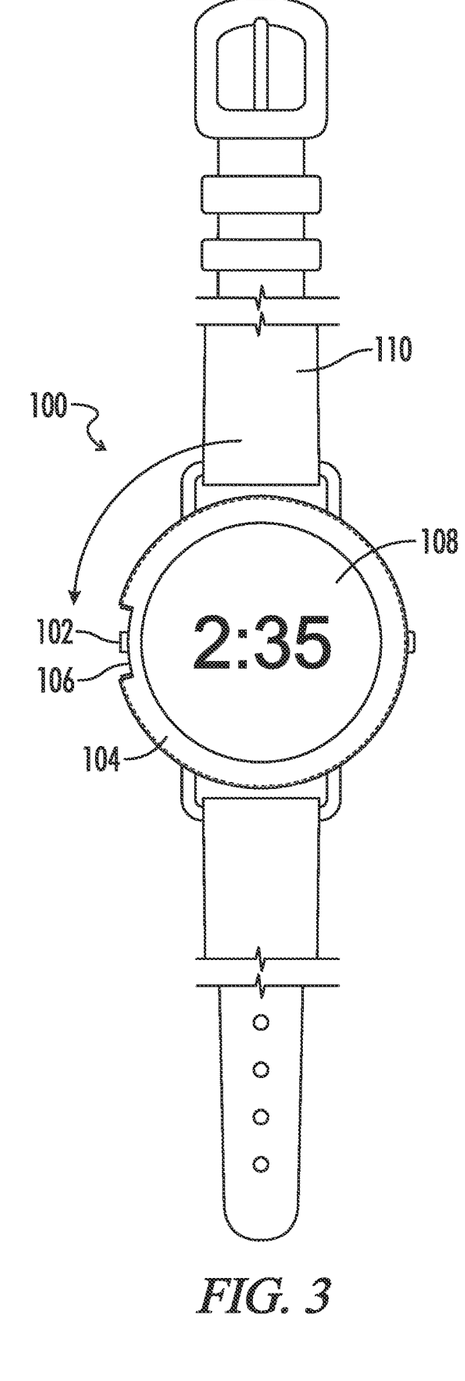
FIG. 3 is a front view thereof.

Referring to FIGS. 1-3, the watch body 112 provides emergency button 102, covering 104, such as a rim or bezel, and face 108. Typically, covering 104 conceals emergency button 102. Covering 104 limits access to the emergency button 102 to reduce accidental usage of the emergency button 102.

Depressing the emergency button 102 located on the personal alarm device 100 initiates the communication with the emergency contacts as discussed below. Covering 104 protects the user from accidentally pressing emergency button 102. The user adjusts the covering 104 to an open position that exposes the emergency button 102 and a closed position that limits access to the emergency button 102. Rotating the covering 104 adjusts the covering 104 between the closed position and the open position.

Covering 104 provides opening 106. The opening 106 enables access to the emergency button 102. The covering 104 adjusts to align the opening 106 with the emergency button 102. Aligning the opening 106 with the emergency button 102 places the covering 104 in the open position. Covering the emergency button 104 with covering 104 places the covering 104 in the closed position that limits access to the emergency button 102. When the user detects an emergency, the user adjusts covering 104 to align opening 106 with emergency button 102. Aligning opening 106 with the emergency button 102 exposes emergency button 102. The user can then press emergency button 102 to initiate communication with the emergency contacts.

The user identifies the type of communication via the method of depressing the emergency button 102. The user depresses the emergency button 102 differently to transmit different messages. The user configures the different messages sent according to the button push. The user assigns each different button push of the emergency button to a different message.

When the user presses emergency button 102, a processor and transmitter/transceiver housed inside watch body 112 initiates communication with the emergency dispatcher contacted at an emergency number, and any user's emergency contacts. In one embodiment, microphone 116 records a message that is transmitted to the emergency dispatcher and any emergency contacts.

In one embodiment, the device activates both the speaker and microphone to allow for two-way communication between the user and emergency personnel at 911. The user then communicates with the emergency dispatcher and any emergency contacts through speaker 114 and microphone 116.

In one embodiment, speaker 114 emits an alarm, such as a loud siren, sound, or other alert, to startle and deter a perpetrator and alert others when a user experiences an emergency. The communication system calls emergency personnel, such as a dispatcher at 911 and sends text messages to any emergency contacts and emergency dispatcher. The user can configure the device to transmit one or multiple communications, including telephone calls and text messages, to the emergency dispatcher, such as 911, and any emergency contacts.

If one emergency contact does not respond, the communication device automatically initiates contact with the next emergency contact. The communication device may also text the emergency contacts. All settings may be adjusted through the personal alarm device 100 itself or by utilizing an app or website that is compatible with personal alarm device 100.

A processor and antenna housed in watch body 112 are capable of recording and transmitting the user's location. The processor and antenna utilize GPS to track and transmit the user's location to emergency responder and emergency contacts. Personal alarm device 100, upon the act of depressing the emergency button, transmits the user's location to selected contacts in real time.

In one embodiment, the user may send an automated message to the emergency contacts and emergency personnel, such as a dispatcher. The automated message may be a prerecorded message and/or text message that includes information selected by the user. The user may enter a predefined input into the personal alarm device to send the automated messages to the emergency contacts. These automated messages may also include the GPS location of the user.

Figure 3A:
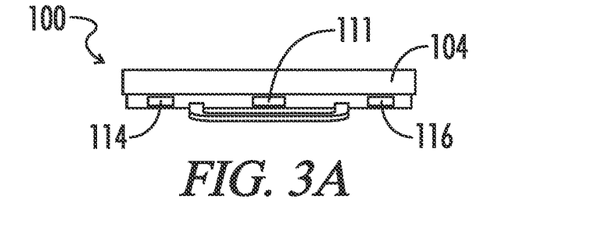
FIG. 3A is a top view thereof.

In one embodiment, watch body 112 also provides a flashlight 111 at the top of the watch body located rear of the covering 104 as shown in FIG. 3A. The flashlight 111 may be activated either on the personal alarm device or by utilizing an app or website that is compatible with the personal alarm device 100. In another embodiment, pressing the emergency button turns the flashlight 111 on. Pressing the emergency button a second time may turn the flashlight 111 off. The flashlight 111 is located on the top of the watch. The positioning of the flashlight 111 at the top of the watch directs the light in front of the user and at the ground. The flashlight 111 shines in front of the user and at the ground to assist the user should the user need to run away from a perpetrator or assailant.

In another embodiment, face 108 provides a light that serves as a flashlight. The flashlight may shine for a preset amount of time. In one embodiment, the flashlight activates for a preset illumination time, such as seven seconds. The user can adjust the settings indicating the duration of which the flashlight shines.

In another embodiment, watch body 112 provides sensors to detect certain health tracking parameters such as steps taken, distance traveled, heart rate, and sleep.

Watch body 112 also houses a battery. In one embodiment, this battery is a rechargeable battery stored within the personal alarm device 100. This battery is charged using a cord that can be connected to a charging power source, such as home electrical system, a car electrical system, a battery, or other power source that charges the battery. In one embodiment, the charger magnetically attaches to the device 100 to charge the device.

FIGS. 1 and 2 show a top view of personal alarm device 100 with emergency button 102 obstructed by covering 104, such as a rim or bezel. An opening in covering 104 adjusts in relation to the emergency button 102. In one embodiment, the covering 104 rotates to align opening 106 with the emergency button as shown in FIG. 3.

FIGS. 1 and 2 show the position of opening 106 when the covering 104 is adjusted to the closed position. The covering 104 obstructs access to the emergency button 102. In the closed position, the covering 104 covers emergency button 102 to limit pressing of the emergency button 102.

Figure 3B:
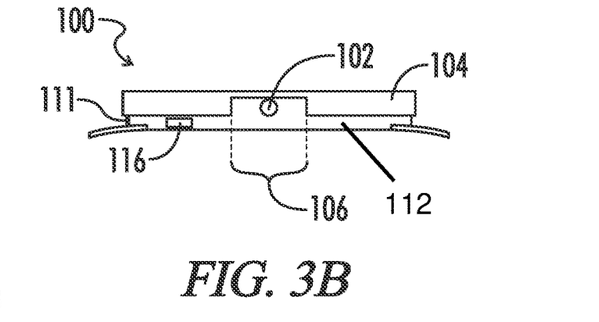
FIG. 3B is a left side view thereof.

FIGS. 3 and 3B shows personal alarm device 100 with emergency button 102 exposed for access. The user adjusts covering 104 from the closed position shown in FIGS. 1 and 2 to the open position shown in FIG. 3. In one embodiment, the user rotates the covering 104 to adjust between the open position shown in FIG. 3 and the closed position shown in FIGS. 1 and 2.

Rotating covering 104 to the open position aligns opening 106 with emergency button 102. The user can access and press the emergency button 102 when opening 104 is aligned with the emergency button 102 in the open position. The user can then press emergency button 102 to transmit alerts and communicate with an emergency dispatcher at 911 and any emergency contacts.

The covering 104 rotates in a first direction to adjust to the open position. The covering 104 rotates in the opposite direction to adjust to the closed position. In one embodiment, a blocking finger stops the rotation of the covering 104 in the first direction to align the opening with the emergency button in the open position. In another embodiment, a blocking finger stops rotation of the covering 104 in the second direction when the covering 104 rotates from the access position to the blocking position.

The covering 104 has been shown as a rotatable bezel. The covering 104 may also be a door that opens and closes to expose the emergency button and obstruct access to the emergency button. The door can pivotally attach or slide in relation to the emergency button for exposing the emergency button.

Figure 4:
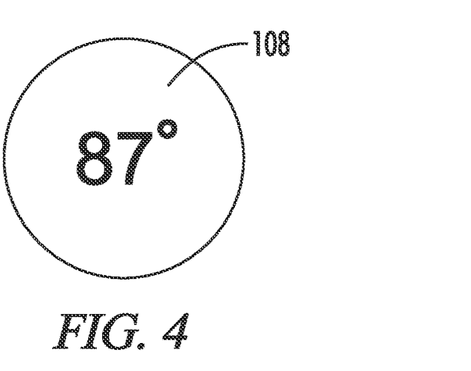
FIG. 4 is a front view of a display of one embodiment of the present invention.
Figure 5:
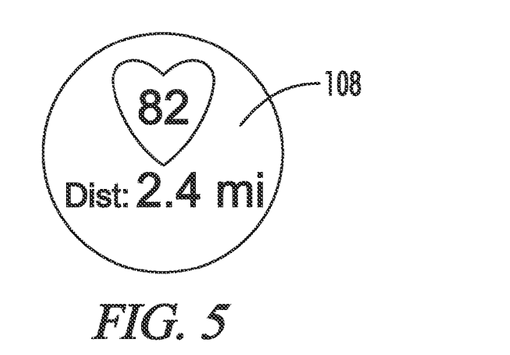
FIG. 5 is a front view thereof.

FIGS. 4 and 5 provide a top view of face 108 of personal alarm device 100. The user customizes the display of face 108 to show the desired information. The display of face 108 will also vary based on the capabilities of the embodiment of the personal alarm device 100.

The user can display different information on the display of face 108 by swiping different directions to change the view. Such information can include the time, the weather, received text messages, health information, etc. Swiping different directions changes the information displayed on the face 108.

The alarm device communicates with emergency personnel such as dispatchers at 911 and emergency contacts. The alarm device enables communication with multiple people via pressing the emergency button. In one embodiment, the user may enter different inputs via pressing emergency button 102 to activate different functions. These functions include but are not limited to, contacting emergency personnel, contacting first responders, contacting the police, contacting 911 operator, and contacting emergency contacts. The user may also instruct personal alarm device 100 to contact the identified contact through voice call or text message. Other functions include activating an alarm and/or a light.

In one embodiment, pressing the emergency button activates the microphone and contacts the emergency personnel and emergency contacts. The device also activates the flashlight. If the user does not press the emergency button a second time, the device also activates the alarm. However, if the user wishes to turn off the alarm, the user may push the emergency button a second time. Similarly, the user may press the button a second time to turn off the flashlight. The user can customize the settings concerning operation of the flashlight and the alarm.

In one embodiment, the light may be a small light on the personal alarm device body. This light faces the ground when the user is in a running motion. In another embodiment, face 108 serves as the flashlight by turning face 108 completely white. The user may set personal alarm device 100 such that pressing emergency button 102 once alerts the user's emergency contacts.

The user may configure the settings of the device 100 to function according to different user inputs entered by the user via the emergency button 102. The user may configure personal alarm device 100 such that pressing emergency button 102 twice activates an audible alarm. A different push button configuration may transmit the automated message to the emergency contact. The user may configure different messages to be sent via the push button configuration. Similarly, in one embodiment pressing the emergency button once will turn on a flashlight, while pressing the emergency button a second time will cause the light to turn off.

The user may also set up the personal alarm device 100 in such a way that pressing emergency button 102 causes the processor to transmit a pre-recorded audio message or pre-set text message.

Figure 6:
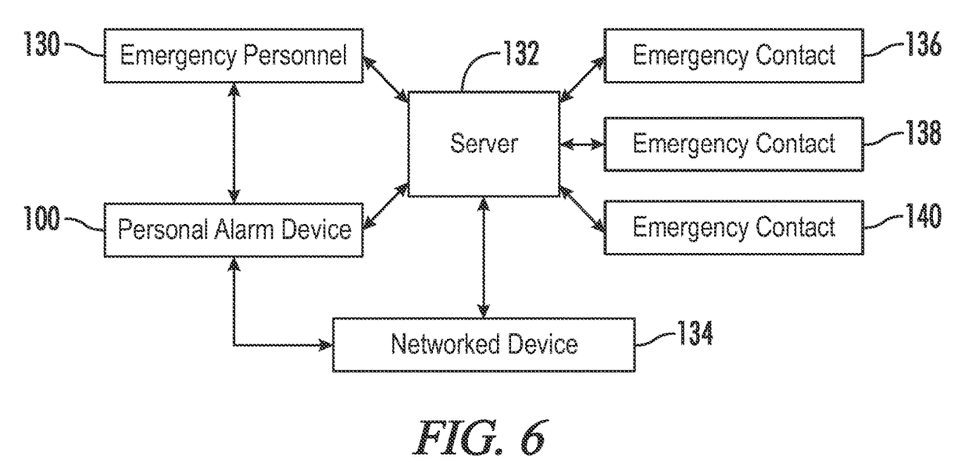
FIG. 6 is an environmental view of one embodiment of the present invention.

FIG. 6 shows an environmental view showing the communication network of the personal alarm device. The personal alarm device includes a cellular communication system, such as an antenna, including, but not limited to a GSM antenna, that allows connection of the device 100 with the cellular network.

The alarm device 100 connects directly with the emergency personnel, such as an emergency dispatcher. Cellular systems enable contact with emergency dispatchers, such as 911, even if the user has not paid for cellular service through a cellular provider. The alarm device 100 directly calls the emergency dispatcher, through 911 or other emergency service. The alarm device 100 communicates directly with the emergency personnel 130, such as a dispatcher, with or without a paid cellular service through a provider.

The system also stores settings for sending additional messages to the emergency personnel and emergency contacts. Some of the settings related to contacting emergency personnel, such as dispatchers at 911, are stored directly on the alarm device 100. Settings related to contacting emergency contacts set by the user may be stored on server 132 or a mobile device wirelessly communicating with the alarm device. The server 132 configures and transmits the messages sent to the emergency contacts.

To access the server 132, the alarm device 100 may directly communicate with the server 132 through a cellular network provided by a network provider, such as a cellular service provider. Such direct communication may require a network plan, such as a cellular plan, associated with the device 100. An alarm device having a network plan communicates directly with the server 132 as well.

If the alarm device 100 does not have a network plan, the alarm device 100 communicates with the server by connecting to a networked device 134, such as a cellular phone, a router, a hot spot, or other device that enables communication between the alarm device 100 and the server 132.

By pressing the emergency button, the alarm device communicates with the emergency personnel 130 and the emergency contacts 136, 138, 140. In one embodiment, the server initiates communication with the emergency contacts 136, 138, 140. The server 132 creates the message and transmits the message to the emergency contacts 136, 138, 140. In one embodiment, the server 132 may also create and send a message to the emergency personnel 130. In another embodiment, a mobile device, such as a smart phone, tablet, or other mobile computing device, wirelessly communicating with the alarm device creates and transmits the messages.

Figure 7:
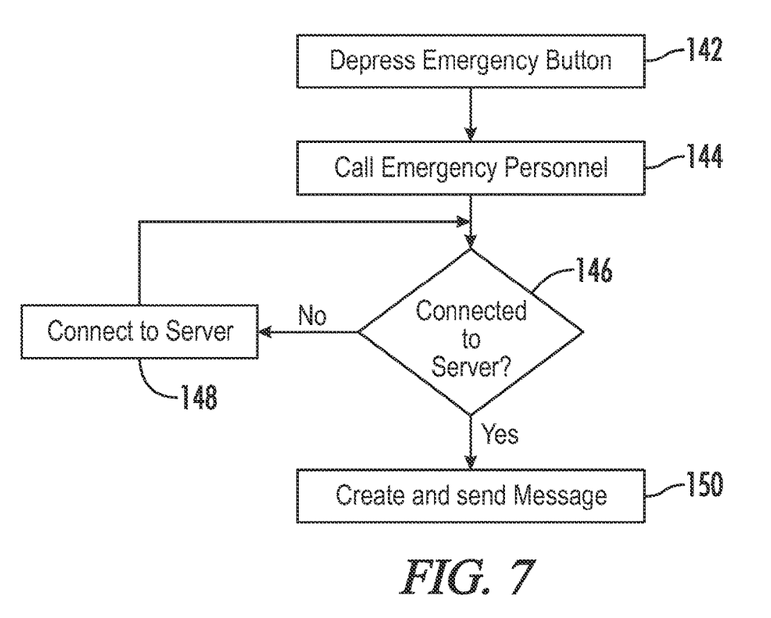
FIG. 7 is a flowchart showing a process of one embodiment of the present invention.

FIG. 7 shows the process of initiating communicating with emergency personnel, such as an emergency dispatcher at 911, and emergency contacts. The user adjusts the covering to the open position, such as by rotating the covering (bezel) to access the emergency button. The user initiates communication with the emergency personnel and emergency contacts by pressing the emergency button at depresses the emergency button step 142. The alarm device calls the emergency personnel at Call Emergency Personnel Step 144. The type of call is determined by the user when configuring the device.

The user may configure the device to send a recorded communication to the emergency personnel or allow live communication with the emergency personnel at Call Emergency Personnel 144. The device sets a default communication type to ensure that emergency personnel at 911 will receive a user's communication if the user does not designate the communication type.

If the user sets the communication as a live communication, the alarm device calls the emergency personnel, such as 911. The user can then correspond with the emergency personnel similar to a phone call through the alarm device.

If the user sets the communication as a recorded message, the alarm device begins recording upon pressing the emergency button at depress emergency button step 142. The alarm device records for a recording time, such as a time ranging from 15 seconds to 5 minutes. The alarm device plays the recording to the emergency personnel upon the emergency personnel answering the phone call.

The alarm device may also transmit an automated message to the emergency personnel. The automated message may be stored on the alarm device. The automated message may include the user's name, the user's location determined by GPS, any health conditions of the user, and any other premade message. Such an automated message may be sent by a phone call and/or text to 911.

Upon pressing the emergency button at depress emergency button step 142, the alarm device may also activate an alarm and a flashlight. Such settings are configured by the user. To turn off the alarm and flashlight, the user presses the emergency button a second time. The settings concerning the alarm and flashing may be stored locally on the alarm device.

The alarm device also transmits messages to emergency contacts. The messages are configured by the user prior to pressing the emergency button. The user defines information to be inserted into the preconfigured messages. The user can select which information each emergency contact receives.

The user defines each emergency contact and the contact information for each emergency contact. The user also configures the information to be included in the message and the method of delivering the message. The information to be included in the preconfigured message, includes, but is not limited to, name, age, location as defined by GPS location of the device, home address, contact information, health information, and additional information or message that the user would like to send.

The user also sets the type of communication to be sent to the emergency contact. The types of communication include but are not limited to voice recording, automated voice message, and text message.

These messages to the emergency contacts may require connection to a server or a mobile device, such as a phone, tablet, mobile computing device, or networked device, to transmit the messages to the emergency contacts. The alarm device determines if the device is connected to the server at Connected to Server Query 146. If the device is not connected to the server, the device continues to attempt to connect to the server until the device connects to the server. As discussed above, the alarm device may connect to the server directly or through the networked device.

The device instructs the server and/or mobile device to create and send the messages to the emergency contacts at Create and Send Messages Step 150. The server creates the messages according to the information that the user has previously entered. The server then transmits the messages to the designated emergency contacts via the designated contact information.

Figure 8:
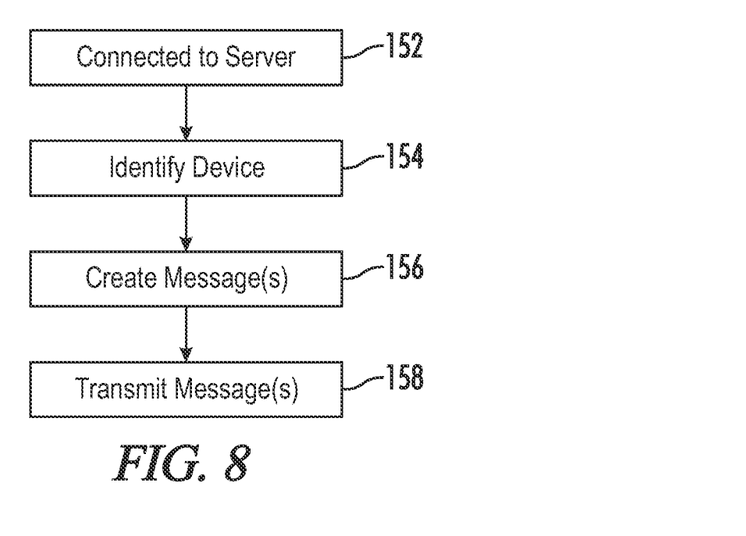
FIG. 8 is a flowchart showing a process of one embodiment of the present invention.

FIG. 8 shows the process of creating and transmitting messages to the emergency contacts. The alarm device connects to the server at connect server 152. The server identifies the device at Identify Device Step 154. The server configures each message according to the identity of the device. The user designates the information to be included each message. The server associates the information with the identity of the device, such as a device identifier.

Upon identifying the device, the server creates the message according to the information designated by the user. Each message may include the user's name, the user's age, the GPS location of the device, the user's home address, the user's contact information, the health status and conditions of the user, and any additional information or message that the user would like to include.

The server creates the message. The server then transmits the created message at Transmit Message(s) step 158. The server logs the transmission and receipt of any sent messages. In one embodiment, the server continues to transmit the message until the server receives a receipt indicating that the message was received by the emergency contact.

The system has been described as saving settings on a server or a device. Any of the settings may be saved either locally or remotely. The settings may also be saved on a mobile device, such as a smart phone or tablet. The mobile device may store the information to be sent to the emergency contacts. The mobile device could create and transmit the messages to the emergency contacts to avoid the use of a separate server. In such an embodiment, the alarm device connects to the mobile device via a wireless connection, such as Bluetooth or other wireless standard.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A personal alarm device worn on a user, wherein the device provides a communication system that communicates with emergency personnel, the device comprising:

a wearable article to be worn by the user;

a face of the article that displays information;

an emergency button located on the wearable article, wherein the emergency button initiates communication directly with the emergency personnel;

a rotating bezel that rotates in relation to the emergency button, wherein the bezel encircles the face, wherein the bezel adjusts between an open position and a closed position, wherein the bezel obstructs access to the emergency when the bezel is in the closed position;

an opening in the bezel, wherein rotating the bezel to the open position aligns the opening with the emergency button, wherein rotating the bezel to the closed position obstructs the emergency button by adjusting the opening offset with the emergency button.

2. The device of claim 1, wherein the wearable article is a watch, wherein the bezel extends circumferentially around the face, wherein the opening in the bezel rotates in relation to the emergency button to align with the emergency button and to be offset from the emergency button.

3. The device of claim 2 further comprising:
a blocking finger that limits rotation of the covering, wherein the blocking finger stops rotation of the bezel to align the opening of the bezel with the emergency button.

4. The device of claim 1 further comprising:
a speaker that plays an alarm after the emergency button is pressed.

5. The device of claim 1 further comprising:
a light that turns on after the emergency button is pressed.

6. The device of claim 1, wherein the communication system calls 911 after the emergency button is pressed.

7. The device of claim 6 further comprising:
a microphone that captures audio, wherein the microphone captures the audio for a phone call between the emergency personnel and the user.

8. The device of claim 6 further comprising:
a microphone that captures audio, wherein the microphone captures the audio for a recording to be sent to the emergency personnel, wherein the recording is transmitted to the emergency personnel.

9. A personal alarm device worn on a user, wherein the device provides a communication system that communicates with emergency personnel and emergency contacts, the device comprising:
a wearable article configured to be worn by the user;
a strap to secure the article to the user's wrist;
an emergency button located on the wearable article, wherein the emergency button initiates communication with the emergency personnel and the emergency contacts;
an adjustable covering that rotates between an open position and a closed position, wherein the covering obstructs access to the emergency when the covering is in the closed position;
an opening in the covering, wherein rotating the covering to the open position aligns the opening with the emergency button, wherein rotating the covering to the closed position obstructs the emergency button with the covering;
a wireless phone system that enables telephone calls;
wherein pressing the emergency button in a first button press configuration transmits a first message to a first contact via the wireless phone system;
wherein pressing the emergency button in a second button press configuration transmits a second message that is transmitted via the wireless phone system, wherein the second button press configuration is different than the first button press configuration, wherein the first message is different than the second message.

10. The device of claim 9, wherein the wireless phone system calls 911 as the first contact after the emergency button is pressed in the first button press configuration.

11. The device of claim 9, wherein pressing the emergency button in the first button press configuration transmits audio captured by a microphone secured to the wearable article as the first message;
wherein pressing the emergency button in the second button press configuration transmits a predefined text message as the second message.

12. The device of claim 9, wherein pressing the emergency button in the first button press configuration transmits audio captured by a microphone secured to the wearable article as the first message;
wherein pressing the emergency button in the second button press configuration transmits a predefined voice message as the second message.

13. The device of claim 9, wherein the first message provides audio to a first contact, wherein the second message provides text to a second contact.

14. The device of claim 9, wherein the first message is transmitted to a first responder;
wherein the second message is transmitted to a second contact, wherein the second contact is not a first responder.

15. The device of claim 9, wherein the first message is transmitted to a first contact;
wherein the second message is transmitted to a second contact, wherein the first contact is different than the second contact.

16. A personal alarm device worn on a user, wherein the device provides a communication system that communicates with emergency personnel and emergency contacts, the device comprising:
a wearable article configured to be worn on the user's wrist;
a strap to secure the article to the user's wrist;
a face of the article that displays information to the user;
an emergency button located on the wearable article, wherein the emergency button initiates communication with the emergency personnel and the emergency contacts;
a rotating bezel located laterally outward from the emergency button, wherein the rotating bezel extends circumferentially around the face, wherein the bezel limits access to the emergency button, wherein the bezel rotates between an open position and a closed position, wherein the bezel obstructs access to the emergency when the bezel is in the closed position;
an opening in the bezel, wherein rotating the bezel to the open position aligns the opening with the emergency button, wherein rotating the bezel to the closed position adjusts the opening away from the emergency button to obstruct access to the emergency button with the bezel;
a wireless phone system that enables telephone calls;
wherein pressing the emergency button in a first button press configuration transmits a first message via the wireless phone system;
wherein pressing the emergency button in a second button press configuration transmits a second message via the wireless phone system, wherein the first button press configuration is different than the second button press configuration, wherein the first message is different than the second message.

17. The device of claim 16, wherein the first message provides audio captured by a microphone secured to the wearable article;
    wherein the second message is a predefined voice message.

18. The device of claim 16, wherein the first message provides audio captured by a microphone secured to the wearable article;
    wherein the second message is a predefined text message.

19. The device of claim 16, wherein the first message is transmitted to a first responder;
    wherein the second message is transmitted to a second contact, wherein the second contact is not a first responder.

20. The device of claim 15, wherein the first message provides audio to the first contact, wherein the second message provides text to the second contact.

\* \* \* \* \*